(12) United States Patent
Mondragon-Parra et al.

(10) Patent No.: US 8,221,249 B2
(45) Date of Patent: Jul. 17, 2012

(54) UNIVERSAL JOINT

(75) Inventors: Eduardo R. Mondragon-Parra, Saginaw, MI (US); Kenta Nakajima, Nanakuni (JP)

(73) Assignee: Steering Solutions IP Holding Corporation, Saginaw, MI (US)

( * ) Notice: Subject to any disclaimer, the term of this patent is extended or adjusted under 35 U.S.C. 154(b) by 158 days.

(21) Appl. No.: 12/708,116

(22) Filed: Feb. 18, 2010

(65) Prior Publication Data
US 2010/0210367 A1 Aug. 19, 2010

Related U.S. Application Data

(60) Provisional application No. 61/153,504, filed on Feb. 18, 2009.

(51) Int. Cl.
*F16D 3/205* (2006.01)

(52) U.S. Cl. .................................... 464/111; 464/905

(58) Field of Classification Search ................ 464/111, 464/120–124, 132, 905; 384/58
See application file for complete search history.

(56) References Cited

U.S. PATENT DOCUMENTS

| | | |
|---|---|---|
| 6,699,134 B2 | 3/2004 | Sams et al. |
| 6,764,406 B2 * | 7/2004 | Mizukoshi et al. ........... 464/111 |
| 6,776,719 B2 | 8/2004 | Perrow |
| 6,776,721 B2 | 8/2004 | Perrow |
| 6,958,016 B2 * | 10/2005 | Hofmann .................... 464/111 |
| 7,121,950 B2 * | 10/2006 | Izumino et al. ............. 464/111 |
| RE39,715 E | 7/2007 | Perrow |
| 7,396,283 B2 | 7/2008 | Perrow et al. |
| 2002/0055390 A1 | 5/2002 | Mizukoshi et al. |
| 2006/0199651 A1 * | 9/2006 | Watanabe et al. ............. 464/111 |
| 2009/0011843 A1 * | 1/2009 | Oh et al. |
| 2010/0216556 A1 * | 8/2010 | Mondragon-Parra et al. ............. 464/111 |

FOREIGN PATENT DOCUMENTS

| | | |
|---|---|---|
| CN | 1576629 A | 2/2005 |
| GB | 2283801 A | 5/1995 |
| GB | 2310476 A | 6/1997 |
| JP | 03172619 A | 7/1991 |

OTHER PUBLICATIONS

Universal Joint and Driveshaft Design Manual. Warrendale, PA: Society of Automotive Engineers, 1979. p. 131-140. TJ1059.S62.*

* cited by examiner

*Primary Examiner* — Gregory Binda
*Assistant Examiner* — Josh Skroupa
(74) *Attorney, Agent, or Firm* — Cantor Colburn LLP

(57) ABSTRACT

A tripot universal joint includes a first rotatable shaft member having a first longitudinal axis and three longitudinal guide channels disposed parallel to the first longitudinal axis, each having two opposing concave side surfaces and a back surface. The joint also includes a rotatable second shaft member having a second longitudinal axis and comprising a spider having three radially extending trunnions equally, each of the trunnions having a convex outer surface disposed within an associated longitudinal guide channel. The joint further includes three rotatable rollers, each rotatably disposed on a convex outer surface of a respective trunnion, each roller having a convex outer surface that is configured for disposition within the concave side surfaces of the longitudinal guide channel with which it is associated for moveable engagement within the channel and an inner surface that is rotatably disposed on the convex surface of the trunnion.

18 Claims, 4 Drawing Sheets

UNIVERSAL JOINT

CROSS-REFERENCES TO RELATED APPLICATIONS

This patent application claims priority to U.S. Provisional Patent Application Ser. No. 61/153,504 filed Feb. 18, 2009 which is incorporated herein by reference in its entirety.

FIELD OF THE INVENTION

The subject invention generally relates to a universal joint. More specifically, the subject invention relates to a telescoping constant velocity joint.

BACKGROUND

There are many different types of universal joints used for transmission of rotational energy. One type of universal joint includes a telescoping constant velocity joint, sometimes referred to as a tripot universal joint. One application for telescoping constant velocity joints, such as various tripot joints, has been automotive axial drive shafts, particularly in front-wheel-drive vehicles between the transaxle differential and the driving wheel. The telescoping constant velocity joint transmits a torque at various rotational speeds, joint angles and telescopic positions between shaft members.

The telescoping constant velocity joint may include a first rotatable shaft member and a second rotatable shaft member. The first shaft member includes a housing. The housing defines a plurality, but preferably three, internal guide channels. The guide channels extend along and parallel to a longitudinal axis of the first shaft member. The second shaft member includes a spider disposed at one end of the second shaft member. The spider is disposed within the housing of the first shaft member. The spider includes a plurality, but preferably three, radially extending trunnions. The telescoping constant velocity joint includes a plurality of roller assemblies. One of the roller assemblies is rotatably mounted to each of the trunnions, and is disposed in one of the guide channels in rolling engagement with the guide channel. The roller assemblies generally include an inner ball disposed within an outer ball and separated by a plurality of roller bearings. The roller bearings are employed to reduce the friction between the outer surface of the inner ball and the inner surface of the outer ball by providing a rotatable assembly whose frictional losses are defined by the rolling friction between the roller bearings and these surfaces rather than sliding or rolling friction that would otherwise exist between these surfaces if the roller bearings were not employed. The roller bearing elements, in combination with the inner ball and the outer ball, effectively create a needle bearing assembly. Such assemblies are widely used in conjunction with tripot universal joints to reduce frictional losses and obtain the desired operational performance from these joint.

While roller bearing assemblies of the type described are capable of providing acceptably low frictional losses and joint operational performance, they are generally costly to manufacture and require design of the roller assemblies to accommodate the roller bearings, including the incorporation of components and design features needed to retain the bearings. Further, the incorporation of the bearings themselves requires that a suitable space envelope in the roller assembly be dedicated to them and any components needed to retain them. Therefore, it is desirable to provide roller assemblies having acceptable frictional losses and operational performance while also avoiding the limitations described above associated with the use of roller bearings to provide this performance.

SUMMARY OF THE INVENTION

In one exemplary embodiment of the present invention, a tripot universal joint is provided. The universal joint includes a first rotatable shaft member having a first longitudinal axis and three longitudinal guide channels disposed parallel to the first longitudinal axis and equally spaced circumferentially from one another, each one of the three longitudinal guide channels defined by two opposing concave side surfaces and a back surface, the back surface of each guide channel facing radially inwardly with respect to the first longitudinal axis, the opposing concave side surfaces of each guide channel disposed parallel to one another and separated circumferentially with respect to the outer drive member by the back surface of that guide channel. The joint also includes a rotatable second shaft member having a second longitudinal axis and comprising a spider having three radially extending trunnions equally spaced circumferentially from one another and on respective coplanar radial axes which intersect the second longitudinal axis at a spider center, each of the trunnions having a convex outer surface disposed within an associated longitudinal guide channel and facing the opposing concave side surfaces thereof. The joint further includes three rotatable rollers, each rotatably disposed on the convex outer surface of a respective trunnion and configured to rotate about the radial axis of the trunnion, each roller having a convex outer surface that is configured for disposition within the concave side surfaces of the longitudinal guide channel with which it is associated for moveable engagement within the channel and an inner surface that is rotatably disposed on the convex surface of the trunnion.

The above features and advantages and other features and advantages of the present invention are readily apparent from the following detailed description of the best modes for carrying out the invention when taken in connection with the accompanying drawings.

BRIEF DESCRIPTION OF THE DRAWINGS

Advantages of the present invention will be readily appreciated as the same becomes better understood by reference to the following detailed description when considered in connection with the accompanying drawings.

DESCRIPTION OF THE EMBODIMENTS

Figure 1:
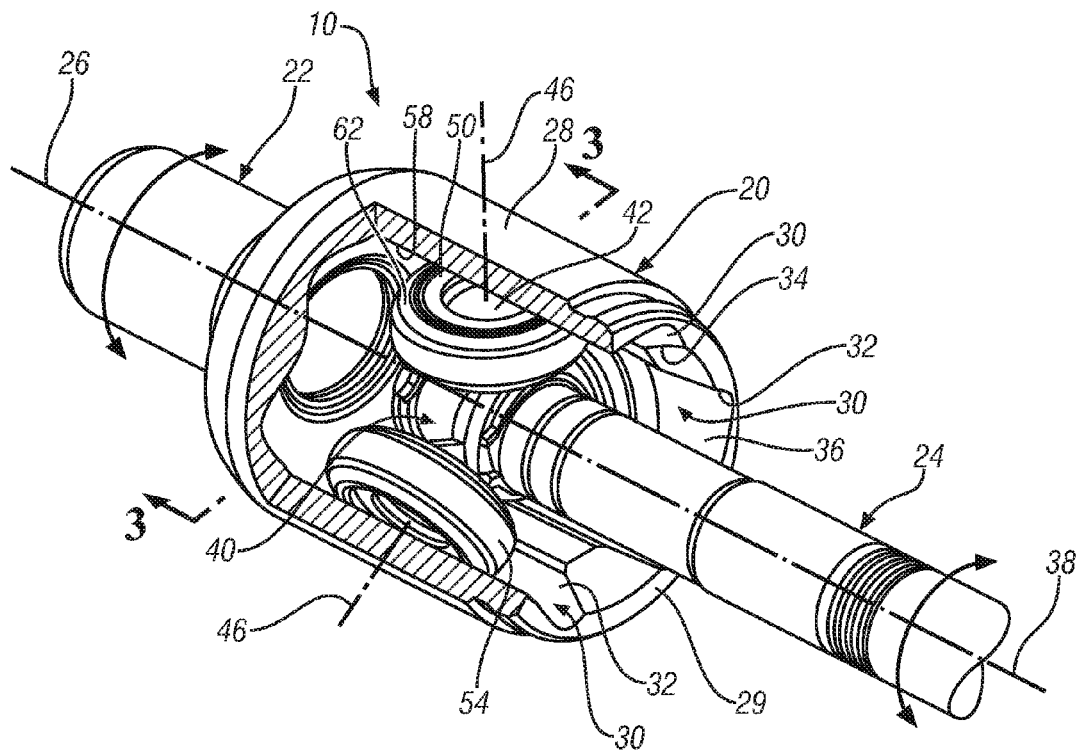
FIG. 1 is a perspective view of an exemplary embodiment of a telescoping constant velocity joint as disclosed herein in an un-articulated position.

The following description is merely exemplary in nature and is not intended to limit the present disclosure, application or uses. It should be understood that throughout the drawings, corresponding reference numerals indicate like or corresponding parts and features.

Referring to the Figures, a universal joint is shown generally at 10. The universal joint 10 is a telescoping constant velocity joint 20, often referred to as a tripot joint. The constant velocity (CV) joint 20 transmits a torque between a first rotatable shaft member 22 and a second rotatable shaft member 24 at various rotational speeds, joint angles and telescopic positions. The constant velocity joint 20 is suitable for use in numerous vehicular applications, including trucks, automobiles, various recreational vehicles and the like, and is particularly useful for use front wheel drive vehicles between the transaxle differential and the driving wheel. However, it should be appreciated that the constant velocity joint 20 may be utilized in other applications in which a torque must be transferred between two rotatable shaft members 22, 24 that must be configured to enable movement of axial and angular positions relative to one another. Universal joint 10 is particularly suitable for use in CV joint 20 applications, including various vehicular applications of the types described above, having reduced maximum torque requirements. It is particularly suitable for use in CV joints having a maximum torque of about 2700 N-m or less. These may include, for example, without limitation, relatively smaller front wheel or four wheel drive vehicles between the front transaxle differential or transfer case and the driving wheel.

Figure 2:
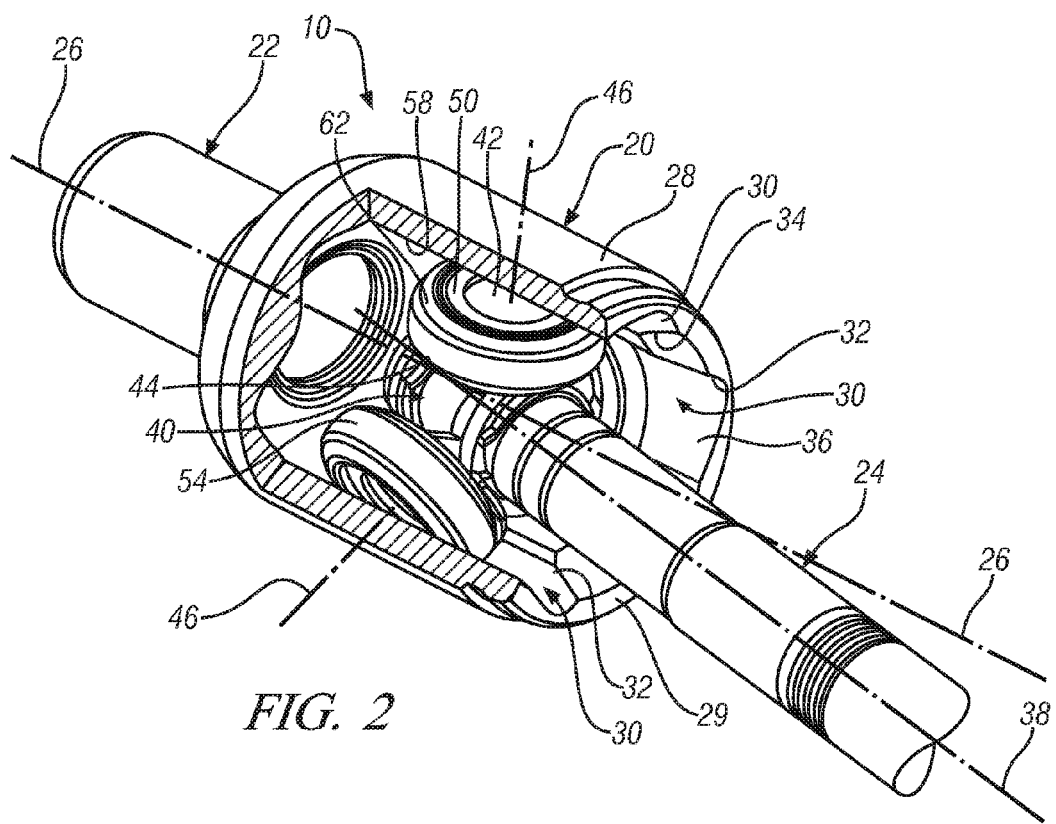
FIG. 2 is a perspective view of the constant velocity joint of FIG. 1 in an articulated position.
Figure 3:
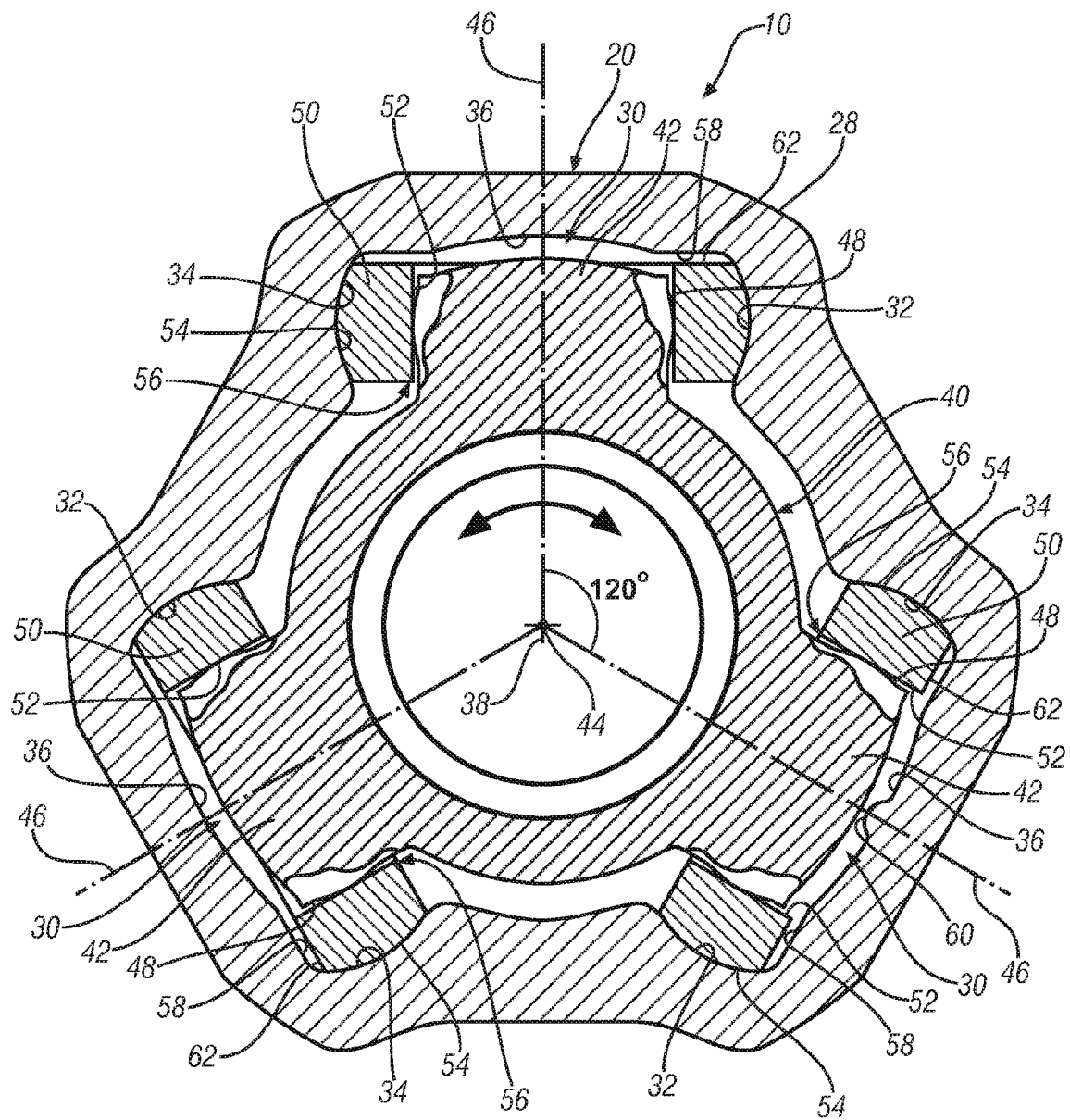
FIG. 3 is a cross-sectional view of the telescoping constant velocity joint of FIG. 1.

The first rotatable shaft member 22 extends along and is rotatable about a first longitudinal axis 26. The first rotatable shaft member 22 includes a housing 28 at a joint end 29. The housing 28 defines a plurality of axially extending guide grooves or channels 30 extending along and parallel with the first longitudinal axis 26 of the first rotatable shaft member 22. In an exemplary embodiment as illustrated in FIGS. 1-3, housing 28 defines three guide channels 30. The guide channels 30 are equally spaced radially about the first longitudinal axis 26. As shown, the three guide channels 30 are radially spaced about the first longitudinal axis 26 at 120 degree intervals from each other. However, it should be appreciated that the number of guide channels 30 within the housing 28 may vary from the three guide channels 30 shown.

Each guide channel 30 includes a first side surface 32 and an opposing second side surface 34. The first side surface 32 and the second side surface 34 are separated circumferentially about the first longitudinal axis 26 by a back surface 36. The back surface 36 faces radially inward toward the first longitudinal axis 26. The first side surface 32 and the second side surface 34 each include a concave shape opposing the other of the first side surface 32 and the second side surface 34. The opposing concave side surfaces 32, 34 of each guide channel 30 are disposed parallel to one another and are separated circumferentially with respect to the first rotatable shaft member 22 by the back surface 36 of that guide channel 30. In an exemplary embodiment, the opposing concave surfaces may comprise surfaces defined by opposing elliptical arcs that extend axially along guide channels 30.

Figure 4:
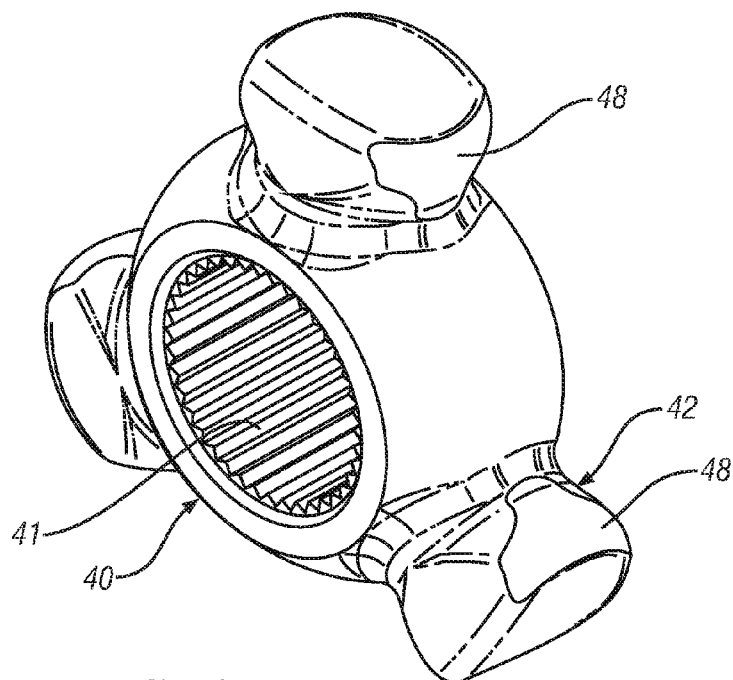
FIG. 4 is a perspective view of an exemplary embodiment of a spider as disclosed herein.
Figure 5:
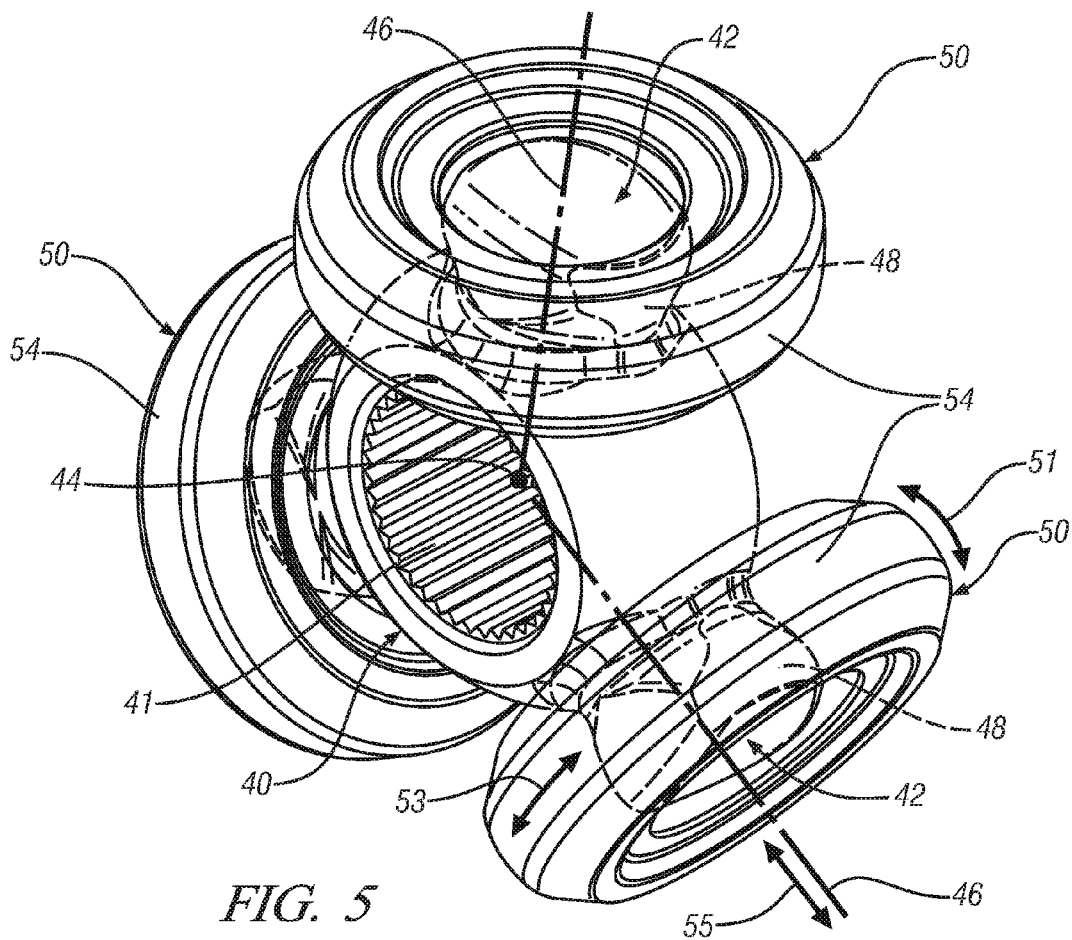
FIG. 5 is a perspective view of the spider of FIG. 4 having exemplary embodiments of rollers as disclosed herein disposed thereon.

As shown in FIGS. 1 and 2, the second rotatable shaft member 24 extends along and rotates about a second longitudinal axis 38. The second rotatable shaft member 24 includes a spider 40 disposed at one end of the second rotatable shaft member 24. The spider may include a splined central bore 41 as illustrated in FIGS. 4 and 5 for engagement with splines on the end of a splined shaft (not shown) to form rotatable shaft member 24. The spider 40 is disposed within and moves relative to the housing 28 of the first rotatable shaft member 22. The spider 40 includes a plurality of trunnions 42 extending radially outwardly from the second longitudinal axis 38. In the exemplary embodiment of FIGS. 1-5, the spider 40 includes three trunnions 42. It should be appreciated that the number of trunnions 42 corresponds with the number of guide channels 30 within the housing 28. As shown, the three trunnions 42 are radially spaced about the second longitudinal axis 38 at 120 degree intervals apart from one another, and are coplanar along a plane (not shown) that is perpendicular to the second longitudinal axis 38 at the spider center 44. Each of the trunnions 42 extends outwardly from the spider center 44 along a trunnion axis 46, and includes a trunnion outer surface 48. The trunnion outer surface 48 has a convex shape that is concentric with the trunnion axis 46. In one embodiment, the convex outer surface 48 has the shape of a truncated toroid, and may be described by a radial arc or radius of curvature that is rotated about a centroid.

As shown in FIG. 1, the first longitudinal axis 26 and the second longitudinal axis 38 coincide or are collinear when the constant velocity joint 20 is at a joint angle of 0 degrees. As shown in FIG. 2, the first longitudinal axis 26 and the second longitudinal axis 38 intersect when the constant velocity joint 20 is articulated or bent at an angle, i.e., when the first rotatable shaft member 22 and the second shaft member 24 are articulated relative to each other. Accordingly, the spider center 44 is disposed along the first longitudinal axis 26 when the constant velocity joint 20 is at a zero joint angle (FIG. 1) and is radially displaced and orbits about the first longitudinal axis 26 when the constant velocity joint 20 is articulated to a non-zero joint angle (FIG. 2).

The constant velocity joint 20 includes a plurality of rotatable rollers 50, with each of the rollers 50 rotatably supported on a respective trunnion 42. Accordingly, the spider 40 of constant velocity joint 20 shown includes three rollers 50, with one roller 50 rotatably disposed on each of the three trunnions 42. However, it should be appreciated that the number of rollers 50 corresponds with the number of trunnions 42 and the number of guide channels 30. Each of the rollers 50 is disposed within and in moveable engagement with one of the guide channels 30 of the housing 28. The moveable engagement may include both rolling engagement and sliding engagement, and both types of engagement may be experienced as the rollers 50 move within the guide channels 30.

The rollers 50 include radially inner surfaces 52 disposed against and abutting the convex outer surface 48 of the trunnions 42. The radially inner surface 52 of the rollers 50 may include a cylindrical shape (FIG. 6) concentric with the trunnion axis 46, including a right cylindrical shape, or a concave shape (FIG. 7), including a truncated ellipsoid shape, concentric with the trunnion axis 46. If the radially inner surfaces 52 of the rollers 50 include the truncated ellipsoid shape, then the curvature of the truncated ellipsoid shape is less than the curvature of the convex trunnion outer surface 48 by an amount sufficient to ensure that the convex outer surface 48 of trunnion 42 nests within concave inner surface 52 of roller 50 and permits the roller to roll on the trunnion (FIG. 7). In certain embodiments, for example the embodiments of FIGS. 6 and 7, the curvature of inner surface 52 is less than the convex outer surface 48 and there is a single point of contact between the trunnions 42 and the rollers 50. This configuration advantageously reduces rolling friction or sliding friction, or both between trunnions 42 and the rollers 50. Alternatively, it should be appreciated that the geometric shape of the radially inner surface 52 of the rollers 50 and the trunnion outer surface 48 may differ from that shown and described herein to achieve a two point contact or a three point contact between the trunnions 42 and the rollers 50 as is known in the art.

The rollers 50 further include a radially outer surface 54 disposed within the concave first side surface 32 and the concave second side surface 34. In an exemplary embodiment, rollers 50 and guide channels 30 may be sized such that radially outer surface 54 is disposed against and abutting the concave first side surface 32 and the concave second side surface 34. The radially outer surface 54 includes a convex shape having a curvature that is greater than the curvature of concave first side surface 32 and second side surface 34, thereby providing a single point of contact between the radially outer surface 54 of the roller 50 and the first side surface 32 and the second side surface 34. Alternatively, it should be appreciated that the geometric shape of the radially outer surface 54 of the rollers 50 and the first and second side surfaces 32, 34 may differ from that shown and described herein to achieve a two point contact or a three point contact between the radially outer surface 54 and the first and second side surfaces 32, 34 as is known in the art. In an exemplary embodiment, where first side surface 32 and second side surface 34 have an elliptical shape as described herein, outer surface 54 may have a convex shape that includes a truncated ellipsoid shape. Further, the curvature of the ellipsoid comprising outer surface 54 may have a curvature that is greater than the curvature of the elliptical arc comprising concave first side surface 32 and second side surface 34.

As the first rotatable shaft member 22 and the second rotatable shaft member 24 articulate and/or telescope relative to each other, the rollers 50 roll along the guide channels 30 of the housing 28. Additionally, as the rollers 50 roll along the guide channels 30 of the housing 28, the rollers 50 tilt 51 and rotate 53, FIG. 5, about the trunnions 42. The rollers 50 are also free to slide 55 on the trunnions 42 axially along the trunnion axis 46, away from and inward toward the spider center 44, as the first rotatable shaft member 22 and the second rotatable shaft member 24 articulate and/or telescope relative to each other.

The rollers 50 are a solid, integral structure, i.e., the rollers 50 are a unitary structure disposed between the trunnions 42 and the housing 28 of the first rotatable shaft member 22. In an exemplary embodiment, the rollers 50 are manufactured from a metal. More particularly, the rollers 50 may be formed from steel, such as by being machined from steel. However, it should be appreciated that the rollers 50 may be formed from other materials, including other metals. As described above, the rollers 50 are solid, unitary articles of manufacture. As such, the rollers 50 reduce the complexity of the constant velocity joint 20 compared to prior art constant velocity joints that comprise ball assemblies, such as ball assemblies that include multiple components, and including those that employ an outer ball and an inner ball separated by needle bearings.

Figure 6:
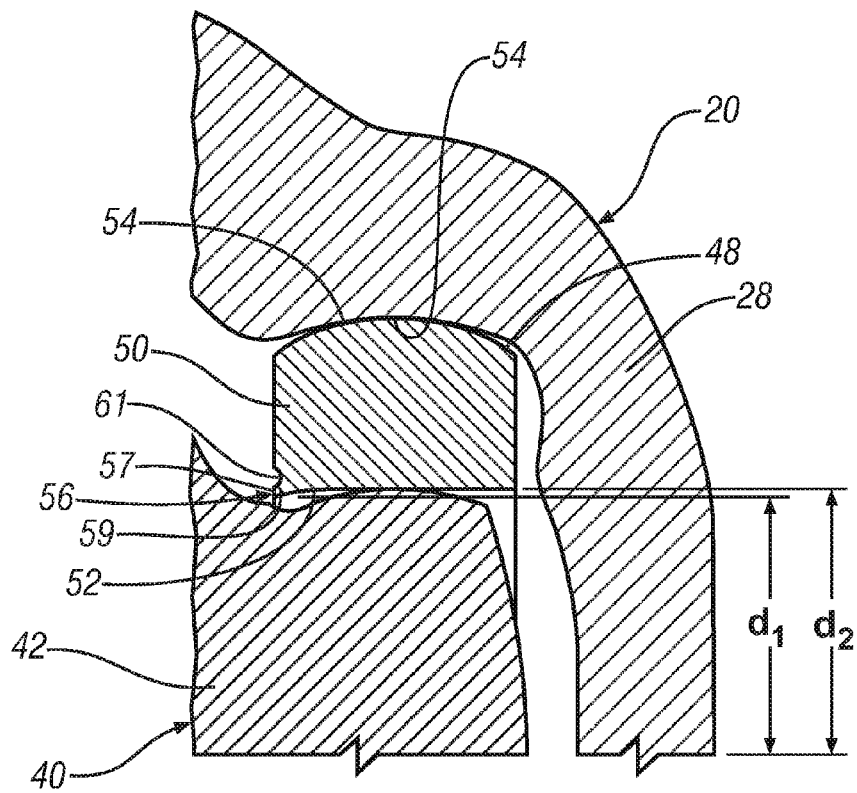
FIG. 6 is an enlarged cross-sectional view of an exemplary embodiment of a trunnion and roller as disclosed herein.
Figure 7:
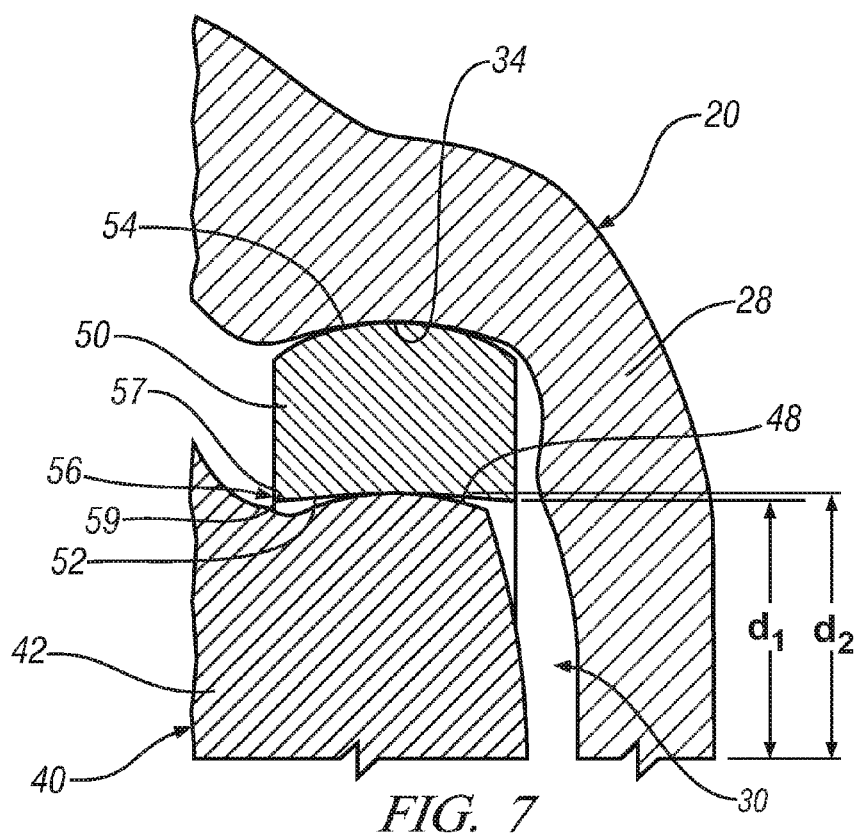
FIG. 7 is an enlarged cross-sectional view of a second exemplary embodiment of a trunnion and roller as disclosed herein.

As shown in FIGS. 3, 6 and 7, the constant velocity joint 20 may include a retention mechanisms or features 56 for retaining the rollers 50 on the trunnions 42. The retention mechanisms 56 aid in handling the individual components of the constant velocity joint 20 prior to assembly, and in assembly of the constant velocity joint 20. However, it should be appreciated that the retention mechanisms 56 are not required for the proper function and operation of the constant velocity joint 20 once the joint is assembled. If the radially inner surfaces 52 of the rollers 50 include a cylindrical shape, then the retention mechanisms 56 may include one or more detents or raised portions disposed on the inner surfaces 52, such as raised portions 59 proximate inner edges 57 of the rollers 50 to prevent their removal from trunnions 42. These may be formed, for example, by localized deformations 61 of the inner edges 57 and raising of inner surfaces 52, such as may be formed by staking or other methods of forming these portions of rollers 50. They may also be formed by control of the formation of inner surfaces 52 during their manufacture, such as, for example, by machining, grinding or otherwise forming inner surfaces 52 to have this characteristic shape, where diameters ($d_1$) of the radially inner surfaces 52 proximate the inner edges 57 of the rollers 50 are slightly less than the maximum diameters ($d_2$) of the convex outer surfaces 48 of the trunnions 42 as shown in FIG. 6. If the radially inner surfaces 52 of the rollers 50 includes the truncated ellipsoid shape, then the retention mechanisms 56 may, for example, include forming the curvatures of inner surfaces 52 so that the diameters ($d_1$) of the radially inner surfaces 52 proximate the inner edges 57 of the rollers 50 are slightly less than the maximum diameters ($d_2$) of the convex outer surfaces 48 of the trunnions 42 as shown, for example, in FIG. 7. The retention mechanisms 56 must, however, allow the rollers 50 to slide axially inwardly and outwardly along the trunnion axes 46 during operation of the joint, particularly the angulation of the joint, and is merely intended to keep the rollers 50 from completely disengaging the trunnions 42 prior to and during assembly of the joint.

As shown in FIG. 3, the back surface 36 of the guide channel 30 may include an outer guide wall 58 or a center guide wall 60, or a combination of both. The outer guide wall 58 or the center guide wall 60 extend lengthwise along the back wall of the guide channel 30, along the first longitudinal axis 26. Each of the rollers 50 may include a radial outer wall 62, with the radial outer wall 62 disposed adjacent to the outer guide wall 58 or the center guide wall 60 to minimize binding of the roller 50 within the guide channel 30. The outer guide wall 58 and/or the center guide wall 60 minimize the potential for the roller 50 to pivot or wobble about the trunnion axis 46, thereby minimizing the possibility of the roller 50 binding within the guide channel 30.

The invention has been described in an illustrative manner, and it is to be understood that the terminology that has been used is intended to be in the nature of words of description rather than of limitation. It is now apparent to those skilled in the art that many modifications and variations of the present invention are possible in light of the above teachings. It is therefore, to be understood that the invention may be practiced otherwise than as specifically described.

What is claimed is:

1. A tripot universal joint, comprising:
a first rotatable shaft member having a first longitudinal axis and a housing, the housing having three longitudinal guide channels disposed parallel to the first longitudinal axis and equally spaced circumferentially from one another, each one of the three longitudinal guide channels defined by two opposing concave side surfaces and a back surface, the back surface of each guide channel facing radially inwardly with respect to the first longitudinal axis, the opposing concave side surfaces of each guide channel disposed parallel to one another and separated circumferentially with respect to the outer drive member by the back surface of that guide channel;
a rotatable second shaft member having a second longitudinal axis and comprising a spider having three radially extending trunnions equally spaced circumferentially from one another and on respective coplanar radial axes which intersect the second longitudinal axis at a spider center, each of the trunnions having a convex outer surface disposed within an associated longitudinal guide channel and facing the opposing concave side surfaces thereof; and three rotatable rollers, each rotatably disposed on the convex outer surface of a respective trunnion and configured to tilt and rotate about the trunnion and to slide along the radial axis of the trunnion, each roller having a convex outer surface that is configured for disposition within the concave side surfaces of the longitudinal guide channel with which it is associated for moveable engagement within the channel and an inner surface that is rotatably disposed on and abutting the convex surface of the trunnion.

2. The universal joint of claim 1, wherein the moveable engagement of the rollers within the channels comprises rotatable or slidable engagement.

3. The universal joint of claim 1, wherein the concave side surfaces have side surface curvatures and the outer surfaces of the respective rollers have outer surface curvatures, and the side surface curvatures are less than the outer surface curvatures.

4. The universal joint of claim 3, wherein the outer surface curvatures and the side surface curvatures establish a single point of contact between the rollers and respective side surfaces.

5. The universal joint of claim 1, wherein the outer surfaces of the rollers comprise truncated ellipsoids.

6. The universal joint of claim 1, wherein the inner surfaces of the rollers have inner surface curvatures and the outer surfaces of the respective trunnions have outer surface curvatures, and the inner surface curvatures are less than the outer surface curvatures.

7. The universal joint of claim 6, wherein the inner surface curvatures of the rollers and the outer surface curvatures of the respective trunnions establish a single point of contact between the rollers and trunnions.

8. The universal joint of claim 1, wherein the inner surfaces of the rollers have cylindrical shapes that are configured for engagement with the convex outer surfaces of the respective trunnions.

9. The universal joint of claim 8, wherein the cylindrical shapes are right cylindrical shapes.

10. The universal joint of claim 1, wherein the inner surface of each roller has a concave shape that is configured for engagement with the convex outer surface of the associated trunnion.

11. The universal joint of claim 10, wherein the concave shapes of the inner surfaces of the rollers comprise truncated toroids.

12. The universal joint of claim 1, wherein the outer surfaces of the trunnions comprise truncated toroids.

13. The universal joint of claim 1, wherein the inner surfaces of the rollers proximate their inner edges further comprise trunnion retention features.

14. The universal joint of claim 13, wherein the inner surfaces of the rollers are cylindrical and the trunnion retention features comprise raised portions proximate the inner edges.

15. The universal joint of claim 13, wherein the inner surfaces of the rollers have concave curvatures and the trunnion retention features comprise the concave curvatures proximate the inner edges.

16. The universal joint of claim 1, wherein the guide channels each have an outer guide wall or a center guide wall, or a combination thereof.

17. The universal joint of claim 1, wherein the guide channels each have an outer guide wall.

18. The universal joint of claim 1, wherein the guide channels each have a center guide wall.

* * * * *